Nov. 9, 1965   F. G. STEELE   3,217,218
ALTERNATING ENERGY CONTROL SYSTEM
Filed July 23, 1962   4 Sheets-Sheet 1

INVENTOR:
Floyd G. Steele
By Marvin H. Kleinberg
Attorney

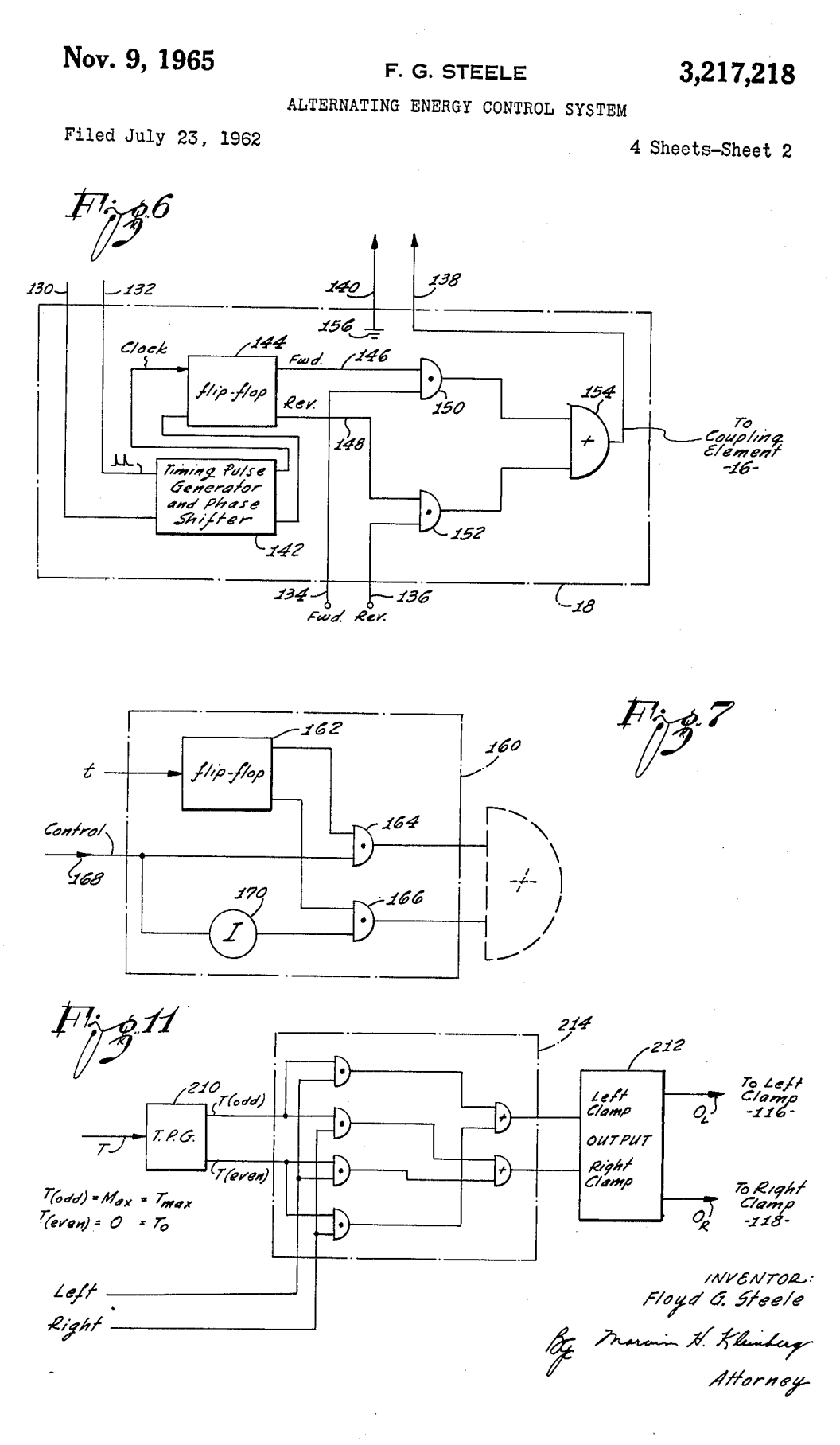

Nov. 9, 1965     F. G. STEELE     3,217,218
ALTERNATING ENERGY CONTROL SYSTEM
Filed July 23, 1962     4 Sheets-Sheet 2

INVENTOR:
Floyd G. Steele
Marvin H. Kleinberg
Attorney

Nov. 9, 1965  F. G. STEELE  3,217,218
ALTERNATING ENERGY CONTROL SYSTEM
Filed July 23, 1962  4 Sheets-Sheet 3

INVENTOR
Floyd G. Steele

By Marvin H. Kleinberg
Attorney

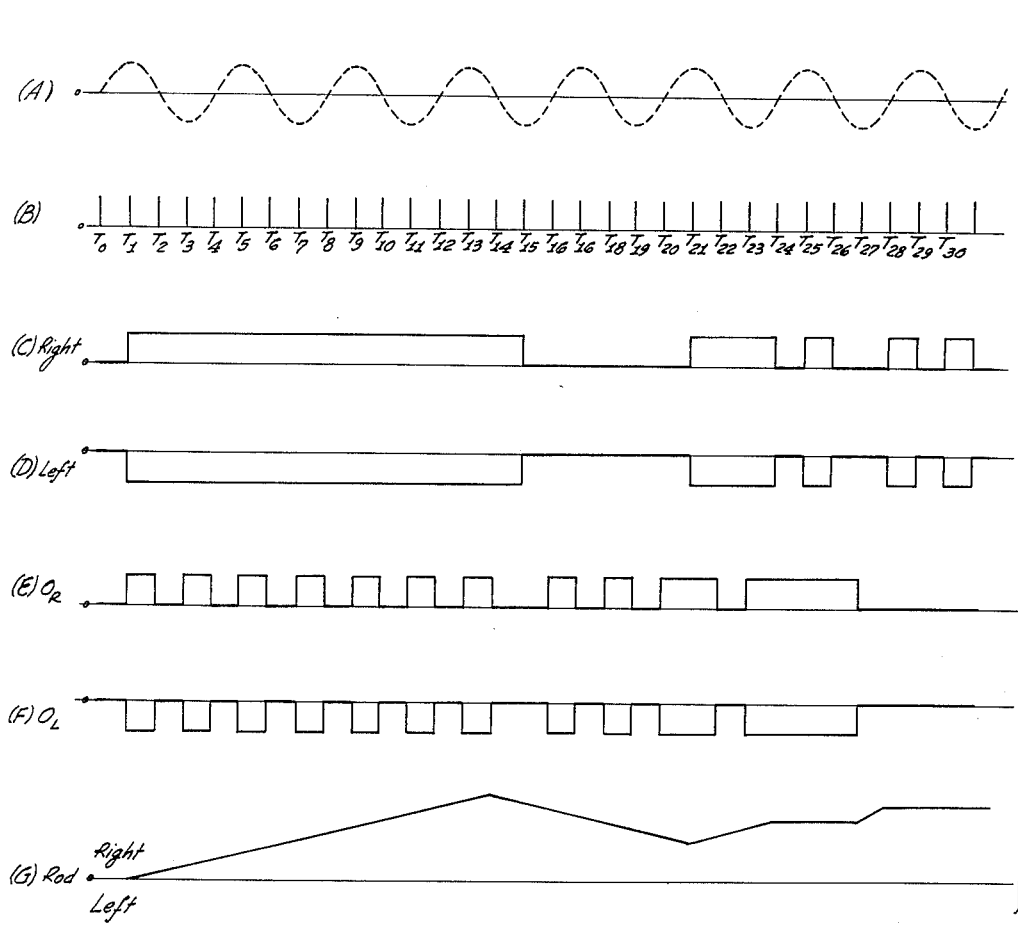

United States Patent Office 3,217,218
Patented Nov. 9, 1965

3,217,218
ALTERNATING ENERGY CONTROL SYSTEM
Floyd G. Steele, 2466 Avenida de la Playa, La Jolla, Calif.
Filed July 23, 1962, Ser. No. 211,675
8 Claims. (Cl. 318—118)

The present invention relates to control systems and, more particularly, to control systems utilizing a power source generating alternating, relatively positive and relatively negative mechanical energy components.

In prior art control systems, mechanical energy, in the form of movement of a member, has been transmitted by coupling a source of motion to a utilization device through various mechanical connections and clutches. To obtain unidirectional motion, unidirectional motion was provided at the source and the intermediate equipment transmitted the motion, with some attenuation, to the utilization device in a fashion similar to the "direct current" or D.C. operation in electricity. The physical motion is transmitted, through rotating members, reciprocating members, gear trains, clutches, and the like. These systems can be of the "all-or-none" type where for example, a clutch is engaged or not to transmit motion or no motion. A second type of system, utilizing proportional control, provides some degree of flexibility in the magnitude of the motion transmitted through the use of gears, variable speed drives and the like.

It is possible, using "all-or-none," "on-off" techniques to provide proportional control if principles comparable to those of alternating current, A.C., electricity are utilized in the source of energy to provide a reciprocating, alternating or oscillatory form of mechanical energy. These "all-or-none" techniques are described in connection with a new computing and control technique that was developed and which combined the advantages of the digital and analog computing and control methods. A complete description can be found in the following patents of the present inventor: Electric Motor Control Systems Employing Di-function Signals, 2,729,773 issued January 3, 1956; Di-function Non-linear Servo System, 2,729,774 issued January 3, 1956; Rate Digital Control System, 2,829,323 issued April 1, 1958; Di-function Multiplexers and Multipliers, 2,840,306 issued June 24, 1958; Di-function Converters, 2,850,726 issued September 2, 1958; Digital Position Servo Systems, 2,860,294 issued November 11, 1958; Computer and Indicator System, 2,898,040 issued August 4, 1959; Di-function Root Extractor Circuits, 2,906,457 issued September 29, 1959; and Input Conversion Methods and Apparatus, 2,954,549 issued September 27, 1960; all of which deal with the concept of the di-function. As will be readily seen from these patents, the di-function signal train, if applied to an electromechanical actuator, will be integrated by the actuator and a relatively smooth actuation results from discrete, discontinuous input signals.

In a simple, exemplary, mechanical A.C. embodiment of the present invention a preferred, a first, or "driving" friction disc is axially mounted to oscillate in a rotational mode. A second, or "driven" friction disc, mounted on a shaft to be driven, is positioned adjacent to and coaxial with the driving disc. A mechanism such as a solenoid displaces the driving disc in the axial direction to engage the driven disc. By properly selecting the times of energization of the solenoid, the discs can be coupled only during the half-cycle of rotation in the desired direction, and decoupled during the alternate half-cycles. The driven disc could then be rotated in either direction by a series of incremental advances. It is preferred that the axial displacements take place only while the disc is changing direction of motion and therefore virtually at rest, so that little or no slip is encountered at the "clutch" interface.

In control systems utilizing a fluid or gaseous medium for the propagation and transmission of energy, as in the conventional hydraulic or pneumatic control systems, the actual movement of the fluid has been necessary to do the work involved, also comparable to the direct current circuits of electricity. A pressure differential is created and a finite volume of the fluid is pumped through the system to displace pistons, plungers, and the like. For the purposes of the present specification, such hydraulic and pneumatic systems, generally, will hereinafter be referred to as "fluid control systems."

Fluid control systems may be grouped in two general categories. The first, "full-on" or "full-off" systems operate, as the names imply, with fluid flowing at full rate or not at all. The other type of systems, the "controlled flow" systems, are those in which the amount of fluid and the rate at which it flows are regulated. However, both systems require that the fluid be physically transported over relatively long distances through suitable conduits in order to perform the desired work functions.

Although continuing improvements in technology have provided fast acting valves, better pumps, improved sealing techniques and closed systems adequate to handle high fluid pressures over relatively long distances, these systems still contain many inherent limitations. Frequently, fluid control systems are located in environments where fluid leak cannot be tolerated. Moreover, losses in pressure may result in dangerous conditions which necessitate the addition of duplicate backup equipment. It may be noted that many of these same problems exist in D.C. electrical systems. For example, transmission of D.C. power is relatively expensive and inefficient, and the D.C. actuators tend to be relatively complex. As electricity, therefore, the second type of operation utilizing an alternating electrical current can be used.

In a fluid or hydraulic system, if an oscillatory form of mechanical energy is impressed upon the medium, such as might be produced by a vibrating diaphragm acting upon the fluid, a comparable advantage can be achieved. If the fluid system is completely closed, one may consider that the entire body of fluid oscillates at the vibration frequency of the diaphragm. However, any incremental volume of the fluid is only displaced, reciprocatingly, a distance which is related to the maximum displacement of the diaphragm. The net or average motion of the fluid over a period of time will be zero, since the positive excursions will equal the negative excursions. Energy will be expended only in overcoming the forces of inertia, friction, slip, and the like.

If a branch in parallel with the closed loop is coupled to that loop by valves which connect the main loop to the parallel branch, then by proper control of the valves, fluid can be made to travel in the parallel branch, even though fluid does not circulate through the entire system. This fluid flow is accomplished by coupling the parallel branch during predetermined portions of the oscillation cycle. For example, coupling the parallel branch during relatively "positive" displacements of the diaphragm and isolating the parallel branch during relatively "negative" displacements of the diaphragm will produce fluid flow in a "positive" direction. Any fluid that is transferred into the parallel branch during the "positive" half of the cycle is exactly balanced by the same volume of fluid which flows out of the parallel branch. Similarly, during the "negative" half of the cycle, fluid taken into the main system is balanced by fluid withdrawn by the parallel branch.

An incremental volume of fluid introduced into the parallel branch will, in successive, alternate half-cycles, flow intermittently through the parallel branch until at some later time it is reintroduced into the main system.

The time of transit of the increment of volume depends upon the frequency of vibration, the volume displaced by positive and negative excursions of the diaphragm, and the volume of the parallel branch.

A piston placed in the parallel branch will travel, just as the incremental volume of fluid does, and by carefully selecting the times for energization, the piston could be made to travel back and forth within the parallel branch. A connecting valve, actuated at the frequency of the vibrating diaphragm can, by proper phase adjustment relative to the frequency of diaphragm vibration, regulate the flow of fluid or the movement of a piston in the parallel branch. This can be accomplished by "logically rectifying" the energy to provide a unidirectional flow. Alternatively, the parallel branch can be coupled for a disproportionate number of "positive" to "negative" half cycles during any given time interval, thus imparting a net "positive" flow to the fluid in the parallel branch. Conversely, a preponderance of negative half-cycles results in a flow in the opposite direction.

Di-function techniques can be used to operate the valves and other control elements of fluid control systems as well as resulting in a simplified system having increased efficiency of actuator operation. As pointed out above, net unidirectional displacement of a driven element can be achieved by providing a bilevel control signal train which is at one level for a greater period of time than at the other level. This type of signal is normally found in di-function signal computation, and therefore a fluid control system is highly susceptible to the use of di-function techniques.

In still other embodiments of the present invention, other physical phenomena, such as electro-strictive or magneto-strictive effects may be utilized to provide bi-directional incremental advances. If, for example, a magneto-strictive rod is subjected to an alternating field so that it expands and contracts, the provision of a pair of clamps (which might also be magneto-strictive elements) could be used to alternatively hold the rod at one end or the other. In "inchworm" fashion, the rod moves in incremental steps in either direction by suitable phasing of energization power to the clamps. At sufficiently high frequencies, the movement can be substantially smoothed and may be utilized in control elements, valves, and other moving actuators.

Other advantages of systems according to the present invention are realized by the full utilization of all of the elements in the mechanical, hydraulic, or pneumatic analogs, corresponding to electrical rectifiers, amplifiers, transformers, and the like which are readily achievable in mechanical, pneumatic, and hydraulic systems.

At the higher driving frequencies, minute incremental motions are imparted which can do useful work. For example, very "fine" adjustments are possible, inasmuch as the single increment of motion is extremely small. In many applications, 1000 cycles per second can be a reasonable driving frequency. By using the transmission properties of many solids, even higher subsonic or ultrasonic frequencies could be used in applications such as cutting or drilling.

Accordingly, it is an object of the present invention to provide an improved system for the transfer of energy to perform useful work.

It is still another object of the invention to provide an improved system for utilizing mechanical energy of an oscillatory form.

It is an additional object of the present invention to provide an improved fluid control system.

It is yet another object of the present invention to provide an improved hydraulic control system.

It is still another object of the present invention to provide an improved pneumatic control system.

It is yet another object of the present invention to provide a system employing the oscillatory energy imparted to a medium in bi-directional actuators.

It is still another object of the present invention to utilize non-linear control elements operating in a non-linear fashion to achieve substantially linear control.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

FIGURE 6 is a schematic diagram of a control circuit suitable for use in the diagram of FIGURE 1.

FIGURE 7 is a block diagram of an alternative control circuit for practicing the present invention;

Figure 5:
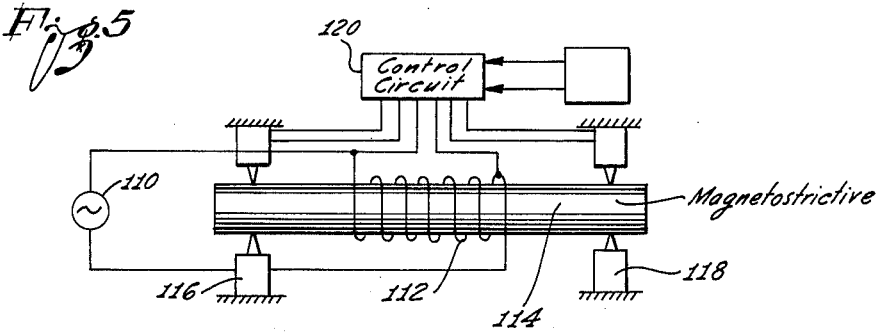
FIGURE 5 is a diagram of yet another embodiment of the present invention in which a magnetostrictive rod is utilized.

FIGURE 8 consisting of FIGURES 8A through 8F inclusive is a series of graphs drawn to a common time base, showing signal wave forms for operating a device according to the present invention;

FIGURE 9, consisting of FIGURES 9A through 9E inclusive, is a second group of signal wave forms in graphic form illustrating an alternative embodiment operating in accordance with the present invention;

FIGURE 10, consisting of FIGURES 10A through 10C inclusive, is a series of graphs illustrating signal wave forms in an other alternative embodiment of the present invention;

FIGURE 11 is a block diagram of a control circuit suitable for use with the embodiment of FIGURE 5; and FIGURE 12, consisting of FIGURES 12A through 12G inclusive, illustrates signal wave forms representing the operation of the control circuit of FIGURE 11 and the embodiment of FIGURE 5.

Figure 1:
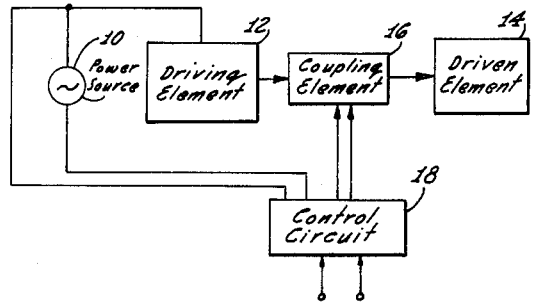
FIGURE 1 is a block diagram of a control system according to the present invention.

Referring now to the drawings, wherein like or corresponding parts are designated by the same reference characters throughout the several figures, there is shown in FIGURE 1, in block diagram form, a typical control system according to the present invention. A power source 10, represented by the conventional symbol for an alternating current source, provides a cyclical or alternating mechanical energy to the system. A driving element 12 is connected to the power source 10 and includes the medium for the transmission of energy. A driven element 14 ultimately converts the transmitted power into useful work and is connected to the driving element 12 by a coupling element 16.

Coupling element 16 selectively connects driving element 12 with the driven element 14 under the supervision of a control circuit 18, which is also connected to the power source 10. The control circuit 18 is adapted to be connected to a source of control signals (not shown), which could be a computer, switch, or other decision elements. The connection between the control circuit 18 and the power source 10 provides both energy and sychronization to the control circuit 18. The control circuit 18 applies control signals to the coupling element 16 of suitable phase and frequency relative to the power source 10 such that the driven element 14 can respond in any desired fashion.

Figure 2:
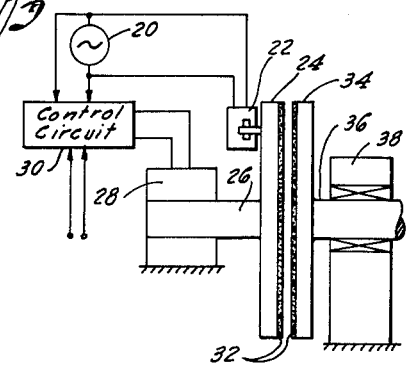
FIGURE 2 is a diagram of one embodiment of the invention of FIGURE 1 in which motion is transmitted through frictional discs.

With reference now to FIGURE 2, there is shown a specific embodiment of a system according to the present invention. A source of A.C. electrical power 20 is connected to a transducer 22, such as an electrical vibrator which converts electrical energy into an alternating or reciprocating, mechanical energy. The transducer 22 is rigidly connected to a driving wheel 24 which is mounted on a shaft 26 that forms the core of a solenoid 28. A control circuit 30 is connected to the power source 20 and provides the necessary energization current to the solenoid 28.

The face of the driving wheel 24 is coated with a facing material 32 having a relatively high co-efficient or friction. A driven wheel 34 is mounted co-axially with, and adjacent to the driving wheel 24, and, in turn, has a shaft 36 about which is rotates. A bearing block 38 supports the shaft 36 and permits it to rotate freely.

In operation, the deenergized solenoid 28 holds tht driving wheel 24 out of engagement with the driven wheel 34. The source of electrical power 20 energizes the transducer 22, which imparts an oscillatory motion of relatively small rotational displacement to the driving wheel 24. When the control circuit 30 is activated to cause rotation of the driven wheel in a direction which corresponds to positive displacements of the driving wheel 24, the solenoid 28 is energized only during those half-cycles that the driving wheel 24 is moving in the relatively positive direction, accomplishing a "rectification" of the energy. The time of solenoid 28 energization is chosen so that frictional surfaces 32 of the driving wheel 24 and the driven wheel 34 are coupled and uncoupled only during those portions of the cycle that the angular velocity of the driving member 24 is zero. Accordingly, the wear on the opposing surfaces is kept at a minimum, and little or no slip is encountered.

Figure 3:
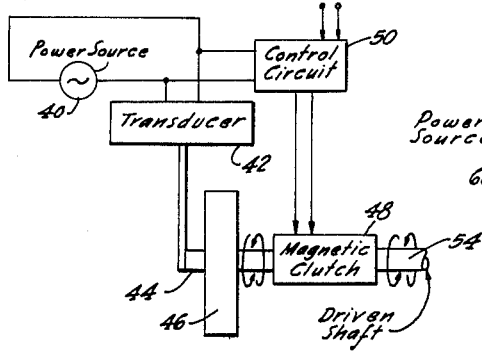
FIGURE 3 is a diagram of an alternative embodiment of the invention of FIGURE 1 in which a magnetic clutch is used as a coupling element.

Turning next to FIGURE 3, there is shown an alternative embodiment in which an A.C. power source 40 is connected to a transducer 42 which applies an oscillatory energy to a driving shaft 44. The shaft 44 is rotatably mounted in a suitable bearing block 46. A magnetic clutch 48, controlled by a suitable control circuit 50, selectively transmits motion from the driving shaft 44 to a driven shaft 54.

The operation of the arrangement of FIGURE 3 is substantially similar to that of the apparatus of FIGURE 2. The magnetic clutch 48 accomplishes the functions of both the solenoid 28 and the frictional surfaces 32 of FIGURE 2. The control circuit 50 determines in which direction the driven shaft 54 shall rotate by providing the clutch 48 with energizing signals of suitable phase and frequency relative to the phase and frequency of the power source 40. With motion sensors (not shown) and a suitable control network, a feedback loop can be created which permits servoing or rotation of the shaft to a predetermined displacement.

Figure 4:
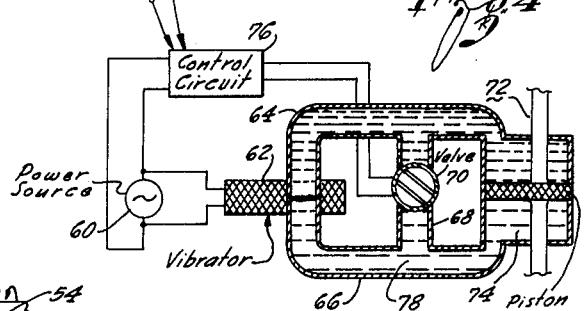
FIGURE 4 is a partially block, partially schematic diagram, of a hydraulic system according to the present invention.

In FIGURE 4 there is illustrated an embodiment of the present invention as applied to a hydraulic system. An electrical A.C. power source 60 is connected to a transducer 62 which may be a simple alternating current vibrator. The hydraulic system includes an upper branch 64, and a coupling branch 68 in which an electrically controlled valve 70 is located. The actuator to be controlled by the illustrated system is a movable piston 72 that is capable of travel either in the upward or downward direction as viewed in the figure. The piston 72 rides in a chamber 74 that communicates with both the upper and the lower branches 64, 66, and serves to isolate the two branches. The valve 70 is electrically controlled by a control circuit 76 to either connect the upper branch 64 with the lower branch 66 or to prevent communication between the branches.

The control circuit 76 is adapted to be connected to a source not shown of input signals which determines whether the piston 72 shall move in the upward direction or downward direction, as viewed in FIGURE 4. The valve 70 may be either normally opened or normally closed, unless there might be an objection to a slight vibration in the piston 72 to which the piston is subjected by the oscillatory energy of a hydraulic fluid 78 moving in the branches when the valve 70 is normally closed. If the valve 70 is normally open, excursions of the fluid 78 take place through the central or coupling branch 68, and the piston 72 is unaffected by the fluid flow.

In normal operation, the power source 60 is connected to the transducer 62 and a reciprocating energy is imparted to the fluid 78 in the branches by the transducer 62. For downward travel of the piston 72, the valve 70 is closed, blocking communication between the upper and lower branches 64, 66 whenever the fluid 78 in the upper branch 64 is moving to the right, as viewed in the figure. When the fluid 78 in the upper branch 64 moves in the opposite direction, that is to the left as viewed in the figure, the valve 70 is opened, permitting communication between the upper and lower branches 64, 66, and the piston 72 is effectively isolated from the fluid system. During each half-cycle of fluid flow, therefore, the piston 72 will move an incremental distance in the downward direction, and during those half-cycles that would normally return the piston 72 in the upward direction, fluid is shunted by the valve 70 through the coupling branch 68. The operation is the same, whether the valve is normally opened or normally closed.

Although not shown herein, other hydraulic embodiments are feasible within the framework of the present invention. For example, a hydraulic system can be designed in which several non-compatible hydraulic fluids are used, each in a separate, sealed system, and interacting each other and the source of power by means of diaphragms. In such an arrangement, a hydraulic fluid can be used with the energy transducer, and can be coupled to a system in which a liquid metal, for example, liquid sodium, can be pumped through a loop in a completely closed system by proper valving. Other variations are possible in which energy is to a first fluid in which is mechanically coupled to a different fluid. Each fluid can be specially compounded to exhibit the optimum characteristics of viscosity and density for its assigned task.

In yet another embodiment of a system according to the present invention, FIGURE 5 illustrates an application utilizing the magnetostrictive properties of a material to provide incremental motion of a sensor or actuator. As shown in FIGURE 5, a magnetostrictive rod, which changes its dimensions under the influence of a strong magnetic field, is the element to be moved, incrementally. A source of electrical energy 110 is connected to a solenoid-type coil 112, which encircles a magnetostrictive rod 114. The rod 114 is mounted between a first and second pair of clamps 116 and 118. These clamps are alternatively energizable by a controlling circuit 120, which is also connected to the power source 110, and which receives signals from an external control unit (not shown).

Normally, the first or left clamp pair 116, and the second or right clamp pair 118 are relaxed. Application of an alternating electrical current to the solenoid 112 causes the rod 114 to expand and contract in phase with the application of the magnetic field generated in the solenoid 112. If one of the clamp pairs is energized at the beginning of an expansion portion of a cycle and the other clamp pair is energized at the end of the expansion portion, holding the rod clamped at both ends in its extended condition, then the rod 114 can be made to move in either direction by selectively releasing one of the pairs of clamps 116, 118 before the field collapses as the electrical current reaches a maximum value. For example, to move the rod 114 to the left, as viewed in FIGURE 5, the right hand clamp pair 118, is energized to grip the rod and a magnetic field is applied. When the magnetic field strength is at its maximum value, the left hand clamp pair 116 is energized and the right hand clamp pair 118 is released. As the magnetic field is relaxed, the rod expands and thereby moves an incremental amount to the left, relative to the pairs of clamps 116, 118.

Other phenomena, such as the electrostrictive effect, which is exhibited by some piezoelectric materials, could also be utilized in embodiments of the present invention. Such embodiments would, however, in most technical aspects, closely resemble the apparatus already set forth. For example, the apparatus of FIGURE 2 could be modified to incorporate driving and driven discs of a polarized piezoelectric ceramic which, under an applied voltage, expands and contracts. In such an embodiment, the solenoid could be eliminated and the discs would be spaced so that they would be in frictional engagement when expanded and out of contact when contracted.

Turning next to FIGURE 6, there is shown in diagrammatic form, a particular embodiment of the control circuit 18 of FIGURE 1, that will provide control signals of desired phase and duration to the coupling element 16 to permit system operation in the manner described above in connection with FIGURE 1.

The control circuit 18 is connected to the power source 10 of FIGURE 1 by a pair of power leads 130, 132. The control circuit 18 receives its control signals from an external source (not shown) on a "Forward" input lead 134, and a "Reverse" input lead 136. Output to the coupling element 16 of FIGURE 1 is provided with first and second output leads 138, 140. Internal to the control circuit 18, there is a timing pulse generator and phase shifter 142 which is connected to the power leads 130, 132 and which derives from the A.C. power source a pair of pulse trains, corresponding to positive and negative maximum values of the power source. A clock flip flop 144 has two inputs, respectively, connected to the timing pulse generator 142 outputs, and two outputs, each corresponding to one of the stable states of the flip flop. One of the outputs is designated the "Forward" output 146 and is energized coincident with the relatively negative maximum value of the A.C. power source 10. The other output, designated the "Reverse" output 148, is energized coincident with the relatively positive maximum value of the power source. Each of the outputs remains energized for one-half cycle of the power source.

The outputs of the clock flip flop 144 are applied, respectively, to one of the inputs of first and second, two-input "and" gates 150, 152, the outputs of which are applied to the inputs of a two-input "or" gate 154. The other input to the first "and" gate 150 is the "Forward" input lead 134 which is energized when forward motion is desired. The first "and" gate 150 is fully enabled when the Forward lead 134 is energized and the "Forward" output 146 of the clock flip flop 144 is energized, corresponding to the excursion of the power source from a relatively negative maximum value to a relatively positive maximum value. The second input to the second "and" gate 152 is provided by the Reverse input lead 136, and the second "and" gate 152 is fully enabled when reverse motion is desired and the Reverse output 148 of the clock flip flop 144 is energized, corresponding to the excursion of the power source from a relatively positive maximum to a relatively negative maximum.

The output of the "or" gate 154 is applied to the first output lead 138 which connects to the coupling element 16 of FIGURE 1. The second output lead 140 is connected to a source of common reference potential 156 indicated by the conventional ground symbol. Since the driving element 12 receives both "forward" and "reverse" motion increments during a complete cycle of the power source 10, the direction of motion imparted to the driven element 14 is determined by the phase and frequency of the energizing signals applied to the coupling element 16. If the "Forward" lead 134 is energized, the coupling element 16 will transmit only "forward" increments of motion to the driven element 14, while if the Reverse lead 136 is energized, the coupling element 16 will transmit only "reverse" increments of motion. The control circuit therefore acts as a "logical rectifier" of the motion of the driving element.

In FIGURE 7, there is shown an alternative form of a control circuit 160 suitable for use in the various embodiments of the present invention. Timing signals, in proper phase relationship with the A.C. power source (not shown) are applied to the input of a triggerable flip flop 162. The two outputs of the flip flop 162 are applied, respectively, to one input each of a pair of two input "and" gates, 164, 166. A signal determining the direction of desired energization of the driven member is applied on a single control line 168, and the polarity of the signal is used to determine the desired direction. The control signal is applied to the other input of a first one of the "and" gates 164, and is also applied to an invertor 170, the output of which is applied to the second of the "and" gates 166. The output of the control circuit 160 is a signal at a first predetermined level which appears at the output of the first "and" gate 164 during one state of the timing flip flop 162, or appears at the output of the second "and" gate 166 during the other state of the flip flop 162.

FIGURES 8, 9, 10, and 12 are timing charts, drawn to a common time base, to illustrate the various methods of control and the system responses thereto. Each figure has been subdivided into individual graphical representations of different signals.

FIGURE 8 consisting of FIGURES 8A–8F inclusive, is made up of several graphs drawn to the same time base, each of which indicates the signal to be found at a different part of the control circuit of FIGURE 6. FIGURE 8A is a graph showing a composite clock pulse train running at twice the frequency of the A.C. power source and which is phased to have each clock pulse coincide with the relatively positive and relatively negative maximum values of the sine wave set out in the graph of FIGURE 8B. The clock pulse train represents the signals applied to both inputs of the clock flip flop 144 of FIGURE 6. FIGURE 8C is a graph of signal levels on the Forward input lead 134, FIGURE 8D is a similar graph of signal levels on the Reverse input lead 136, and FIGURE 8E is a graph of the output signal which is applied on output lead 138 to the coupling element 16. FIGURE 8F is a graph showing the resulting relative displacement of the driven element relative to a central or null point.

As will be noted from FIGURES 8E and 8F, whenever an output signal is applied to energize the coupling element the displacement of the driven element changes. If the output occurs during the positive going portion of the power cycle, the displacement is in the relatively positive direction, while if the energization occurs during the negative-going portion of the cycle, the displacement is relatively negative. In this embodiment, the driven element remains at rest whenever no signal is applied to the coupling element.

Examining FIGURE 8 as an entirety during the first six timing intervals, the Forward input is energized producing three output pulses during the positive-going halves of the power cycle and the movable member is displaced three increments in the positive direction. For the next ten timing intervals, the Forward input is deenergized, and the Reverse input is energized. An output signal remains high for the negative-going portion of the A.C. cycle and then occurs four more times, each during a negative-going portion of the A.C. sine wave, displacing the movable member by a total of five increments in the relatively negative direction. For the next interval of four timing pulses, neither input is energized and no output pulses are produced.

If the nature of the system supplying the control signals is such that one line must be energized at all times, then a zero average displacement can be achieved by alternate energizations of the Forward and Reverse inputs, as illustrated during the twenty-first through twenty-seventh intervals. If the Forward and Reverse inputs are energized during negative and positive going half cycles, respectively, as in intervals 21–24, there is no output signal. If, however, the Forward and Reverse inputs are energized during positive and negative going half cycles, respectively, the resultant motion is then a series of equal-valued positive and negative excursions.

FIGURE 9, consisting of FIGURES 9A through E, graphically illustrates the effect of a synchronous difunction input control signal having a difunction clocking rate equal to the frequency of the A.C. source. The input signal is phased so that the beginning of each difunction clocking interval coincides with a maximum excursion of the sine wave, and, in the embodiment shown, the first half of each difunction interval corresponds to the negative-to-positive half cycle. A control circuit similar to that shown in FIGURE 7 can accept a difunction input signal train of the form shown in FIGURE 9C. If the outputs of the "and" gates 164, 166, of FIGURE 7 are combined in an "or" gate, as is done with the "and" gates of FIGURE 6, the output to the coupling element can be represented by the graph of FIGURE 9D. FIGURE 9E is a graph of displacement of the movable member in response to the signal train of FIGURE 9D.

Examining the difunction train, it will be noted that the pattern of the first five difunction intervals is repeated in the next five intervals. In each group of five, there is an extra, one-valued interval, corresponding to a difunction representation of one-fifth. Referring now to FIGURE 9E, the net displacement of the movable element after ten intervals is two increments in the positive direction, which represents a net change of one increment for each five intervals. It can be shown that all of the advantages of difunction control can be utilized directly within the frame work of the present invention.

FIGURE 10, made up of FIGURES 10A, 10B, and 10C, is drawn to the same time scale as FIGURE 9. The timing and phase information in FIGURES 9A and 9B can be directly incorporated in FIGURE 10, in which a simple "on-off" control is used to direct full energization of a driven member from one limit position to another limit position using a control circuit similar to that of FIGURE 7. If a limit position has been reached by the driven element and the signal to direct motion in the opposite direction has not yet been provided, provision can be made for additional circuitry, well within the skill of the art, to disable the illustrated circuits.

During the first twelve timing intervals of FIGURE 10A, a full positive signal is generated, and during the next twelve intervals, a full negative signal is generated. FIGURE 10B illustrates the resulting alternating energizing signals which are applied to the coupling element during the first twelve intervals. In the next interval, when the opposite motion is desired, the control signal remains at its low level for one additional interval and then alternates for the remaining eleven time intervals. In the twenty-fifth interval, referring to FIGURE 10A, a positive signal has again been given and the control signal (in FIGURE 10B) remains at its upper level for one additional interval before resuming the alternating pattern. The displacement of the driven member is indicated in FIGURE 10C. The member is driven during those intervals that the signal of FIGURE 10B is at its relatively high level.

FIGURE 11 is a block diagram of control circuit suitable for the apparatus of FIGURE 5, which has utilized the magnetostrictive phenomenon to achieve incremental linear motion of a driven element. With reference to FIGURE 5 and FIGURE 11, a timing pulse generator 210, which may be merely a flip flop circuit, provides a first output coincident with the occurrence of the even numbered timing pulses ($T_{even}=T_0,T_2,T_r \ldots T_{2n}$), and a second output, coincident with the occurrence of the odd numbered timing pulses ($T_{odd}=T_1,T_3,T_t \ldots T_{2n-1}$).

An output flip flop 212 provides an energizing signal $O_L$ to the left pair of clamps 116 in one stable state, and signal $O_R$ to the right set of clamps 118 in the other of its stable states. The output flip flop 212 has a pair of input terminals, each determining one of the output states. A logic network 214 combines the outputs of the timing pulse generator 210 and the left (L) and right (R) control input lines to control the output flip flop 212 according to the following logical relationship:

$$O_L=L.T_{odd}+R.T_{even} \quad O_R=R.T_{odd}+L.T_{even}$$

One suitable mechanism of these equations is shown within the dotted lined logic network 214, and those skilled in the art will readily perceive ways of devising alternative structures.

FIGURE 12, made up of FIGURES 12A–12G graphically describes the response of the magnetostrictive rod to applied control signals. It will be noted that during the first several intervals, the rod is in virtually continuous incremental motion to the right, since the left clamp pair is energized at maximum constriction, coinciding with maximum applied magnetic field, and the right clamp pair is energized at maximum expansion when the applied magnetic field is at its minimum. When motion in the opposite direction is desired, the left clamp pair is energized at maximum expansion, and the right clamp pair is energized at maximum constriction.

The "inchworm" motion in either direction can be provided. Should an average displacement of zero be desired, then the control signals should alternate every time interval. As seen in FIGURES 12C–G, the twenty-fourth through twenty-seventh intervals, alternating control signals produce a steady state of the output flip flop 212 in one of its stable states $O_R$, and if the phase of the applied input signals is changed, the output flip flop 212 assumes its other stable state $O_L$. In either case, the rod will only be clamped at one end and therefore will merely constrict and expand in place.

Thus, there has been described an improved method of control system operation which utilizes concepts analogous to those of alternating current electricity. Mechanical energy of alternating relatively positive and relatively negative energy components is selectively transmitted to utilization devices. By selecting the time interval during which energy is transmitted relative to the mechanical energy frequency of alternation; the utilization device can receive only relatively positive energy components or relatively negative energy components, neither or both in equal amounts. Such operation is comparable to full forward, full reverse, off or idle in conventional systems. By providing positive or negative energy components in unequal or disproportionate amounts, the utilization device can be operated in a proportional fashion, with both direction and magnitude subject to control.

What is claimed as new is:

1. In a control system utilizing mechanical energy of alternating positive and negative components at a predetermined frequency, the combination of:
   (1) a source of alternating mechanical energy;
   (2) a driving element connected to said energy source;
   (3) clutch means connected to said driving element and engageable in response to applied control signals;
   (4) a driven element connected to said clutch means; and
   (5) control means connected to said clutch means for applying control signals thereto and operable in response to first and second input signals for engaging said clutch means to transmit only positive and negative energy components respectively from said driving element to said driven element.

2. In a fluid control system utilizing mechanical energy of alternating positive and negative components at a predetermined frequency, the combination of:

(1) a source of alternating mechanical energy having relatively positive and relatively negative energy components;
(2) a fluid for transmitting energy;
(3) transducer means coupling said energy source to said fluid imparting said positive and negative energy components thereto;
(4) an actuator operable in first and second modes, corresponding respectively to application of positive and negative energy components; and
(5) control means for coupling said fluid to said actuator and operable in response to applied first and second control signals to impart positive and negative energy components, respectively;
whereby provision of first control signals results in said first mode of actuator operation and provision of second control signals results in said second mode of actuator operation.

3. In a fluid control system including a fluid, a fluid reservoir, and means for communicating the fluid throughout the system, the combination comprising:
   (a) means for imparting an alternating mechanical energy having relatively positive and relatively negative energy components to the fluid;
   (b) a fluid controlled actuator operable in response to applied fluid;
   (c) control signal generating means connected to said energy imparting means for producing first and second control signals coincident with and corresponding to relatively positive and relatively negative energy components, respectively; and
   (d) valve means connecting said actuator with said fluid system, said valve means being operable in response to applied control signals to permit fluid flow between said actuator and said system;
said valve means permitting unidirectional fluid flow into said actuator in response to one of said control signals and permitting unidirectional fluid flow out of said actuator in response to the other of said control signals.

4. In a control system utilizing mechanical energy of alternating positive and negative components at a predetermined frequency, the combination of:
   (1) a power source;
   (2) a movable member having magnetostrictive properties, said member having first and second ends;
   (3) generating means coupled to said power source for applying an alternating magnetic field to said member;
   (4) first and second holding means for releasably engaging said movable member, each positioned near an end thereof; and
   (5) control means connected to said generating means, said power source, and said holding means and operable in response to applied first and second control signals to alternatively energize first and second holding means at times of relatively maximum and relatively minimum applied magnetic field;
said control means responding to first control signals to energize said first holding means for energizing said member at applied magnetic field maximums, and responding to second control signals to energize said second holding means for engaging said member at applied magnetic field maximums.

5. An alternating energy control system comprising: a source of alternating energy producing positive and negative components; driving means; means for coupling said source to said driving means to actuate said driving means to oscillate substantially in phase with said positive and negative components; a driven element; coupling means selectively actuable to connect said driving means to said driven element; and a control circuit for receiving control signals designating bi-directional movement of said driven element, said control circuit including a first circuit for translating said positive and negative components of said source and said control signals into positive actuating signals for driving said driven element in one direction in response to one control signal and into negative actuating signals for driving said driven element in the opposite direction in response to a second control signal.

6. A control system comprising: a source of oscillatory mechanical energy composed of relatively positive and negative energy components; a utilization device operable in a first mode of response to move in a first direction in response to positive energy, and in a second mode of response to move in a second direction opposite to said first direction in response to negative energy; transmitting means coupled to said source and driven thereby in said first direction in response to positive energy and in said second opposite direction in response to negative energy of said source; selectively actuable coupling means for coupling said transmitting means to said utilization device to impart movement in said first direction when actuated by a first control signal and for coupling said transmitting means to said utilization device to impart movement in said second opposite direction when actuated by a second control signal; and control signal generating means coupled to said source and receiving input signals designating the direction of movement to be controlled in said utilization device, for producing said first and second control signals.

7. A difunction control system comprising: a mechanical energy oscillator producing positive and negative energy components; a driven element adapted to be moved in a positive direction in response to applied positive energy and in a negative direction in response to applied negative energy; a driving element coupled to said oscillator for direct response thereto for positive and negative movement; an on-off coupling element operable in response to one applied input signal to couple said driving element to said driven element to impart positive movement thereto and in response to a second applied input signal to couple said driving element to said driven element to impart negative movement thereto; and a difunction control circuit for receiving a difunction input signal representing positive and negative movements and for producing appropriate input signals for said on-off coupling element.

8. A control system comprising: transducer means adapted to be connected to a source of power for generating alternating, oscillatory mechanical energy; carrier means coupled to said transducer means; actuator means responsive to one phase of mechanical energy for translating said energy into positive movement and responsive to a second phase, opposite to said first phase, of mechanical energy for translating said energy into negative movement; coupling means connected between said carrier means and said actuator means for selectively transmitting first or second phase energy to said actuator means in response to first and second control signals, respectively; and control means for receiving input signals representing the movement to be controlled in said actuator means and also receiving power in phase with said alternating, oscillatory mechanical energy, for producing said first and second control signals applied to said coupling means.

References Cited by the Examiner
UNITED STATES PATENTS

| | | | |
|---|---|---|---|
| 1,708,093 | 4/29 | Holmes | 310—37 |
| 2,425,733 | 8/47 | Gille et al. | 74—388 |

MILTON O. HIRSHFIELD, *Primary Examiner.*